United States Patent
MacGregor et al.

(10) Patent No.: US 7,849,952 B2
(45) Date of Patent: Dec. 14, 2010

(54) TRACTOR WITH TWO ENGINE SETTINGS

(75) Inventors: Don MacGregor, Winnipeg (CA); Brent Gabriel, Winnipeg (CA); James Thomas Dunn, Winnipeg (CA); Leonard Bergman, Winnipeg (CA)

(73) Assignee: MacDon Industries Ltd, Winnipeg, MB (CA)

( * ) Notice: Subject to any disclaimer, the term of this patent is extended or adjusted under 35 U.S.C. 154(b) by 547 days.

(21) Appl. No.: 11/833,612

(22) Filed: Aug. 3, 2007

(65) Prior Publication Data

US 2008/0047245 A1 Feb. 28, 2008

Related U.S. Application Data

(60) Provisional application No. 60/839,679, filed on Aug. 24, 2006.

(51) Int. Cl.
*B60K 17/356* (2006.01)

(52) U.S. Cl. .................................. 180/306; 180/308

(58) Field of Classification Search ......... 180/305–308, 180/65.28
See application file for complete search history.

(56) References Cited

U.S. PATENT DOCUMENTS

| | | | |
|---|---|---|---|
| 3,543,508 A * | 12/1970 | Schwab | 60/449 |
| 4,306,640 A * | 12/1981 | Morgan | 477/2 |
| 4,368,705 A | 1/1983 | Stevenson | |
| 4,523,892 A | 6/1985 | Mitchell | |
| 5,433,064 A * | 7/1995 | Schmitt et al. | 56/6 |
| 5,845,689 A * | 12/1998 | Egging et al. | 144/334 |
| 5,967,756 A | 10/1999 | Devier | |
| 6,199,006 B1 | 3/2001 | Weiss et al. | |
| 7,017,674 B2 | 3/2006 | Bell | |
| 7,213,389 B2 * | 5/2007 | Teijido et al. | 56/10.8 |
| 7,357,214 B2 * | 4/2008 | Ho et al. | 180/307 |
| 7,555,883 B2 * | 7/2009 | Fackler et al. | 56/10.2 E |
| 2006/0113140 A1 * | 6/2006 | Nakamura et al. | 180/306 |

* cited by examiner

*Primary Examiner*—J. Allen Shriver, II
*Assistant Examiner*—Katy Meyer
(74) *Attorney, Agent, or Firm*—Adrian D. Battison; Ade & Company Inc.

(57) ABSTRACT

A tractor has hydraulically driven wheels at a cab end and castor wheels at an engine end. It can be driven cab forward in a working mode with a header on the forward end. It is rotated to engine forward in the transport position for more stable higher speed travel. The driver's console is rotated in the cab with the steering and speed control elements moved with the seat for the driver to face forwards and its position is detected by switches. In the engine forward position for transportation, the control system detects the seat position and operates the controls for higher speed drive and to prevent operation of the header. The engine has a series of ratings which can be selected depending upon whether the header motor is engaged so that a highest engine speed is used only when the header is disengaged and the lower speed is used for higher fuel efficiency when the header is operating.

19 Claims, 5 Drawing Sheets

TRACTOR WITH TWO ENGINE SETTINGS

This application claims the benefit under 35 U.S.C. 119 of Provisional Application 60/839,679 filed Aug. 24, 2006.

This invention relates to a tractor of the type commonly used as a swather tractor, which is supported on a pair of hydraulically driven wheels and a pair of castor wheels, and particularly to and engine control system which may provide improved engine operation efficiency.

This application is related to U.S. application Ser. No. 11/116,418 filed Apr. 28, 2005 and Canadian application, Serial No: 2,505,458 filed Apr. 27, 2005 both entitled "TRACTOR WITH REVERSIBLE OPERATOR POSITION FOR OPERATION AND TRANSPORT" the disclosure of which is incorporated herein by reference.

BACKGROUND OF THE INVENTION

Hydrostatically driven tractors have been around for many years and their application to windrowers has been significant. The tractor includes a tractor frame, a crop harvesting header mounted on the tractor frame for movement across the ground to harvest a standing crop, the header having a hydraulic motor for driving components of the header in the harvesting action, the tractor having two driven ground wheels each driven by hydraulic motor, a header control actuable by the driver, a first pump for generating a flow in a first pressurized hydraulic fluid for driving hydraulic motors of the ground wheels, a second pump for generating a flow in a second pressurized hydraulic fluid for driving the header motor, and an internal combustion engine on the tractor frame for driving the first and second pumps.

Recent developments in internal combustion engines have required what are known as "Tier Three" certified engines for EPA approval. It has been found that EPA Tier Three certified engines consume significantly more fuel than the Tier Two engines did, particularly at part load. This problem has been further compounded with increased fuel costs recently.

There are many patents by Caterpillar on engine control systems primarily used on earth moving equipment, and some are as follows:

U.S. Pat. No. 4,368,705 (Stevenson) issued Jan. 18, 1983 which discloses in relation to highway tractors the use of different timing maps of the fuel control to meet EPA standards, but does not relate to swather tractors which use different driving conditions;

U.S. Pat. No. 4,523,892 (Mitchell) issued Jun. 18, 1985 which is used in an excavator and which discloses controlling the hydraulic pump and the engine speed to reduce the pump displacement when the engine speed is lugged down.

U.S. Pat. No. 5,967,756 (Devier) issued Oct. 19, 1999 which discloses, in relation to an excavator, controlling the hydraulic pump and the engine speed to generate a required flow at best efficiency;

U.S. Pat. No. 7,017,674 (Bell) issued Mar. 28, 2006 which discloses changing the operating characteristics of an implement when attached to a tractor for use in different situations.

Also U.S. Pat. No. 6,199,006 (Weiss) issued Mar. 6, 2001 by Deere discloses reducing engine speed as a function of vehicle speed to avoid applying too much draw bar force at low speeds. This mentions engine performance maps.

SUMMARY OF THE INVENTION

It is one object of the invention to provide an improved tractor of the type for transporting a header which allows improved engine operation efficiency.

According to the invention there is provided a crop harvesting machine comprising:

a tractor frame;

a crop harvesting header mounted on the tractor frame for movement across the ground to harvest a standing crop;

the header having at least one header hydraulic motor for driving components of the header in the harvesting action;

the tractor having a first driven ground wheel driven by a first hydraulic motor and a second driven ground wheel driven by a second hydraulic motor;

a header control actuable by the driver to provide a control signal indicative of a requirement for supply of driving fluid to the at least one header hydraulic motor to drive the components thereof;

a first pump for generating a flow in a first pressurized hydraulic fluid for driving the first and second hydraulic motors;

a second pump for generating a flow in a second pressurized hydraulic fluid for driving the at least one header hydraulic motor;

an internal combustion engine on the tractor frame for driving the first and second pumps;

the second pump having a flow rate control system for supplying a constant rate of the second pressurized hydraulic fluid for driving the at least one header hydraulic motor at a constant rate regardless of changes of rpm of the engine, the engine having a fuel injection pump;

an engine control system for controlling the fuel injection pump so as to control an amount of fuel injected and a timing of the injection;

a driver control system including a throttle control actuable by the driver to move between a minimum engine speed position and a maximum engine speed position to provide a control signal to the engine control system;

the engine control system being arranged to control fuel supply and injection timing so as to maintain engine power output at or below an allowable power output curve;

the engine control system being arranged to provide at least two selectable settings for engine rpm where a first one of the settings is at a higher engine rpm and a second one of the settings is at a reduced engine rpm;

the first of the settings being selected when the header components are not driven;

the second of the settings being selected when the header components are driven;

the first setting being arranged such that, when selected, movement of the throttle control to the maximum engine speed position causes the engine control system to drive the engine at the higher engine rpm; and the second setting being arranged such that, when selected, movement of the throttle control to the maximum engine speed position causes the engine control system to drive the engine at the reduced engine rpm.

Preferably the engine control system is arranged such that the allowable power output curve provides a power output at the higher engine rpm which is less than a power output at the reduced engine rpm.

Preferably the higher engine rpm is a maximum allowable engine rpm.

Preferably the second of the settings is selected in response to actuation of the header control by the driver to drive the header components and the first of the settings is selected in response to actuation of the header control by the driver to halt drive to the header components. Although other factors or functions can be used to actuate the selection of the two settings.

Preferably the first pump is arranged such that a rate of the first pressurized hydraulic fluid varies as the rpm of the engine changes.

Preferably the first pump is arranged at a maximum stroke for maximum flow rate such that a rate of the first pressurized hydraulic fluid varies as the rpm of the engine changes. This allows maximum speed to be obtained in the first setting when the header is not engaged.

Preferably the first and second settings are selected by a manually operable switch operable by the driver.

Preferably the engine control system is arranged such that the allowable power output curve provides a fuel usage of the engine at the second setting which is less than the fuel usage at the first setting.

Preferably there is provided a cab mounted on the tractor frame, the two driven wheels being mounted at a driven end of the tractor frame and there being provided two non-driven castor wheels of the tractor mounted at a second end of the tractor, the cab being mounted on the frame at the driven end, the driven end having mounting assemblies for supporting the header at a position in front of the driven end and in front of the cab when the driven end is forwards, the engine being located between the cab and the second end of the frame, there being provided an operator's seat on which the operator can sit which is rotatable in the cab from a cab forward position in which the operator's seat faces the driven end of the frame to an engine forward position in which the operator's seat faces the second end with the engine in front of the operator's seat, where the first and second settings are selected by a switch operable by rotation of the seat.

Preferably the operation the speed control is changed such that the driven wheels can rotate at higher speed to drive the tractor at higher ground speed when the operator's seat is in the engine forward position.

Preferably the first and second motors have a higher drive range which can be accessed only when the engine control system is in the first setting.

Preferably the first and second motors have a low speed range in the second setting and the low speed range and a high speed range in first setting.

Preferably the first and second motors have one low speed range and one intermediate speed range in second setting and have the low speed range, and a high speed range in the first setting.

Extensive field tests under various load conditions have determined that at slower speeds, using the arrangement of the present invention, the engine can be used in a manner which will recover much of the fuel economy which has been lost due to the requirement for the Tier Three engine.

Some engines of this type are designed with a huge torque rise with increased load as the engine lugs down in rpm. This actually results in a power bulge so that, for example, horse power increases from 130 at a rated speed of 2300 rpm to 140 hp at 2000 rpm. Maximum torque occurs when the engine gets lugged down to 1400 rpm.

In addition to the engine power bulge, the header drive is such that the pumps compensate for changes in engine speed and maintains a constant header speed. As the engine rpm drops, the pump displacement increases to maintain header speed. At approximately 1800 rpm the pumps reach full displacement, after which if the engine rpm decreases further the header speed will decrease correspondingly.

One disadvantage of reducing the engine speed is that it also reduces the maximum ground speed capability. This can be compensated by changing the gear ratio to the pumps but there are limitations to the maximum speed that the traction drive pumps can run, so the gear ratio remains unchanged. This also can be compensated by changing the motor displacement using a 2 speed or a 3 speed motor.

Tier Three engines have electronic control of fuel (amount of fuel and injection timing). This facilitates running the engine efficiently at various speeds. EPA regulates emissions under various conditions and the maximum engine rating cannot be exceeded. In one example the engine is designed to produce 130 hp at 2200 rpm along the hp/rpm curve down from the rated speed. Electronics in some engines provide the ability to store up to three additional engine ratings in addition to the standard EPA rating.

To be EPA legal, the ratings cannot exceed the EPA certified rating curve and the machine must have the ability to run at the EPA rating.

The present arrangement thus uses at least two of the available engine ratings in conjunction with the compensating fluid rate header drive to provide good fuel economy. The arrangement provides the highest (EPA) engine speed for fast transport. So in the engine forward mode the only engine rating that will be available is the EPA rating.

In the field, which is where the machine spends most of its time and where fuel economy is most critical, the other three engine ratings are now available to the operator. The arrangement can provide alternate rated speeds of 2000, 1900 and 1800 rpm. In the field position, but when the header is not engaged, the control is arranged such that the EPA rating is always in effect so as to give the machine a high ground speed when travelling in the field while not cutting. When the header is engaged the engine control system automatically goes into an alternate engine rating mode. The machine can be shipped from the factory programmed with an alternate rating of 2000 rpm. By going into the machine's programming mode the operator can choose also the 2200 (EPA standard) or can choose as the alternate rating mode the 1900 or 1800 rpm ratings.

As an alternative to controlling the switch between the two ratings using the engagement of the header as the deciding factor, alternative arrangements can be provided. Thus for example the control system can be arranged such that, when the tractor is in header forward or field position, the alternate engine rating is in effect and whenever the tractor is in engine forward or transport position the standard EPA rating is in effect.

In a second alternative example, there is a switch on the console that activates the dual speed ranges for the ground speed. In the header forward or field position this is used to activate the alternate engine rating when in the low speed position and the EPA rating in the high speed position.

In a further alternative arrangement, a separate switch on the console is used in the header forward position only and selects either the EPA standard rating or the alternate rating, regardless of the header being engaged or not.

There are combinations of the above four alternatives that could be used.

A very important side benefit of running the engine slower is a very significant reduction in noise. Also running components at slower speeds can reduce wear and provide longer service life.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
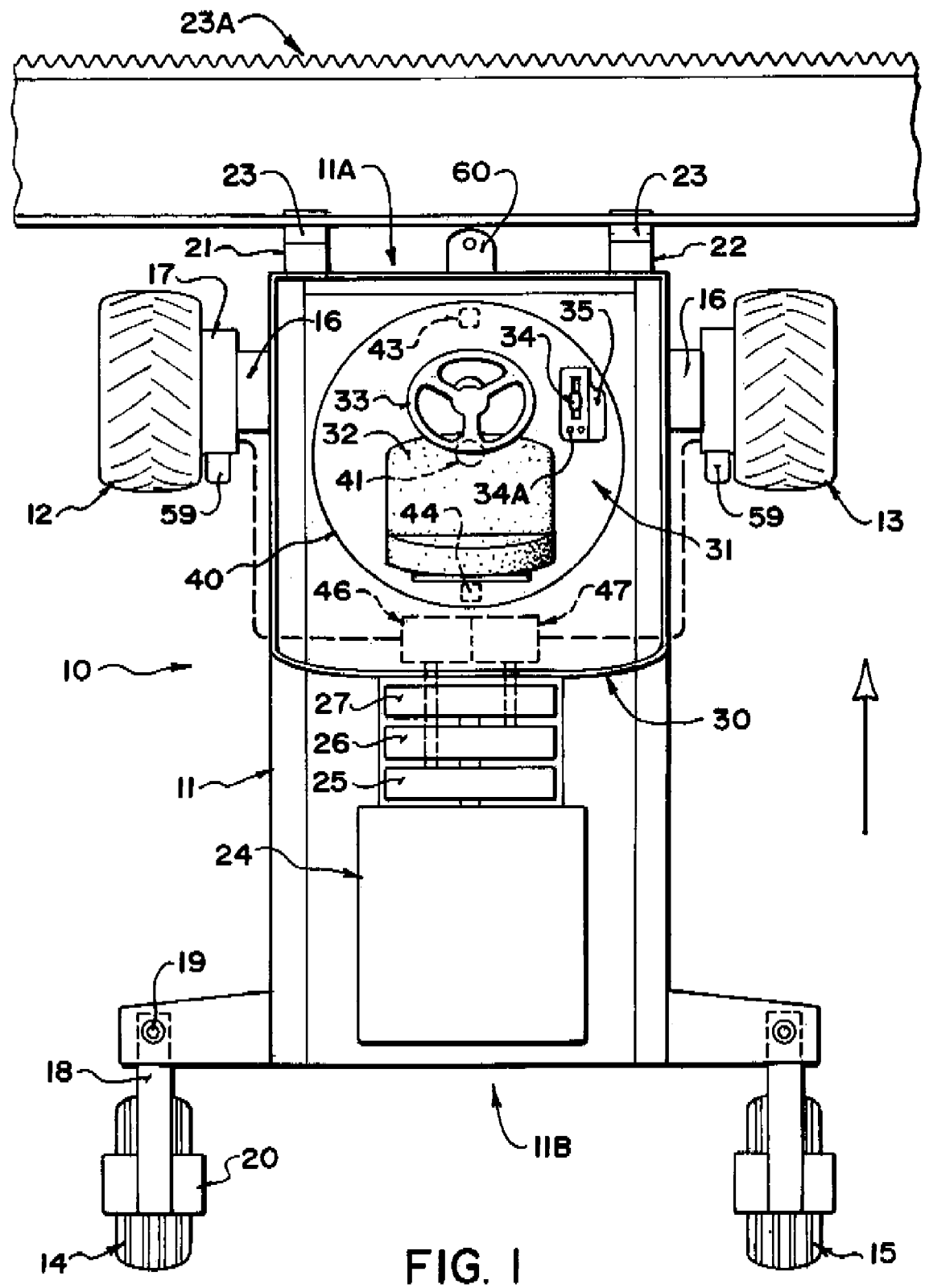
FIG. 1 is a top plan view partly in phantom and partly broken away showing a tractor according to the present invention in the cab forward position.

Reference is made to the above identified co-pending application of MacDon, from which some of the above drawings and following description is taken.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23A. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches include a header height and angle control by way of a four way (two axis) switch, a reel height and forward location control by way of a four way (two axis) switch and a reel speed control two way one axis switch so that the skilled operator can control the parameters of the header during the working action. The header is engaged by a main drive control lever in many cases also be reversed in the event of a blockage and thus will include a switch for allowing such reversal.

Many of the above components are well known and conventional and can be found in many different designs of such tractors manufactured by a number of manufacturers including the present assignee.

Figure 2:
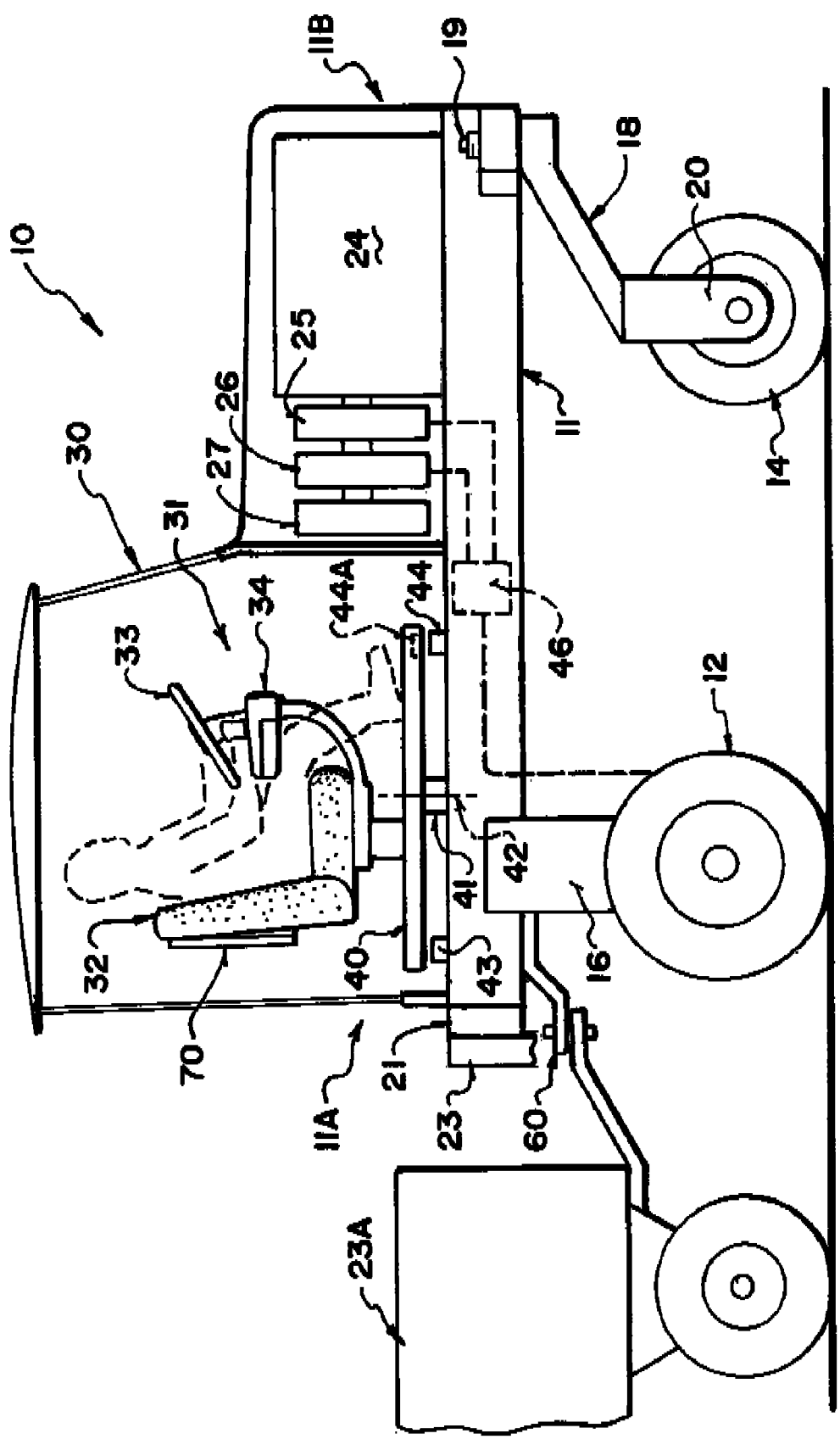
FIG. 2 is a side elevational view of the tractor of FIG. 1 in which the operator's seat and console have been rotated for operating the tractor in an engine forward position.
Figure 3:
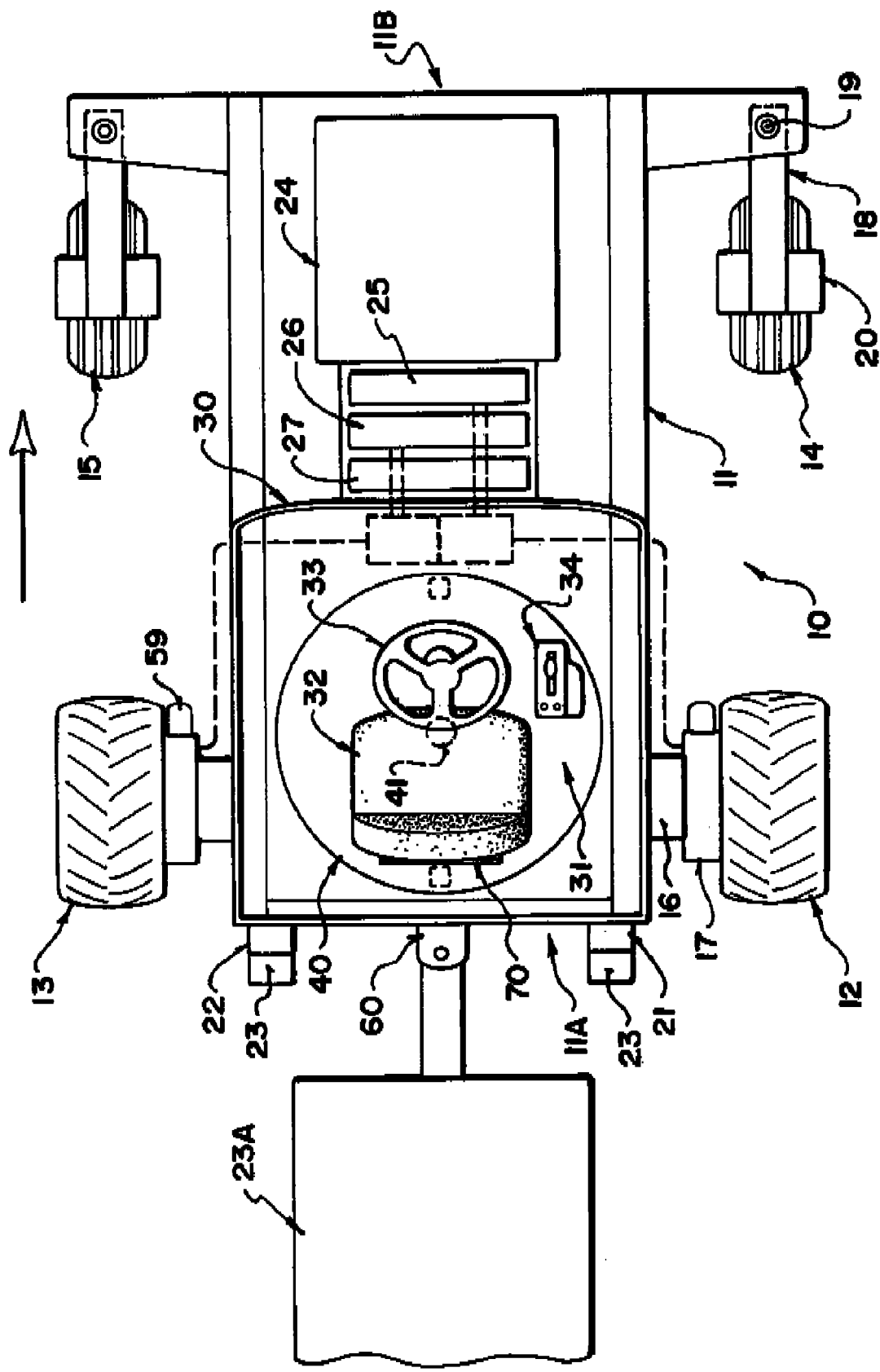
FIG. 3 is a top plan view similar to that of FIG. 1 showing the tractor in the engine forward position.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIGS. 2 and 3 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

The positioning of the platform in the two positions is detected by a pair of switches 43 and 44 which co-operate with an element 44A carried on the platform. Thus only when the platform and the seating console are properly located and fixed in one of the selected positions, is this position detected by the respective switch 43, 44 which is used in the control system as set forth hereinafter. The speed control 34 and the accessory control 35 and the display board 32A are fixed relative to the seat and the platform so that they rotate with the platform. Thus the operator, in both positions has the controls arranged exactly in the same position for operation in an exactly symmetrical manner. Thus the speed control works in the same manner in that rearward drives the vehicle toward the rear of the operator as the operator sees at the time and forward movement of the lever drives the lever forwardly in the orientation of the operator at the time. Mechanical and electrical coupling extend from the control systems including the steering, speed control and accessory control from the platform, through the support shaft 41 to a position underneath the frame where those communicating mechanical and electrical links cooperate with the relevant structures underneath the vehicle for controlling the movement of the vehicle. It will be appreciated that, when the operator is in the cab or position shown in FIG. 1, movement of the speed control lever toward the end 11A moves the vehicle in the direction of the end 11A. When the seat is reversed, movement of the same lever in a direction away from the operator moves the lever toward the end 11B and must operate the tractor to move the vehicle along the direction toward the end 11B. This requires the linkage to be reversed since the effect of the lever must be reversed as the seat is rotated from one position to the other. This can be achieved by mechanical linkage or can be achieved by electrical connections as will be apparent to one skilled in the art.

Figure 4:
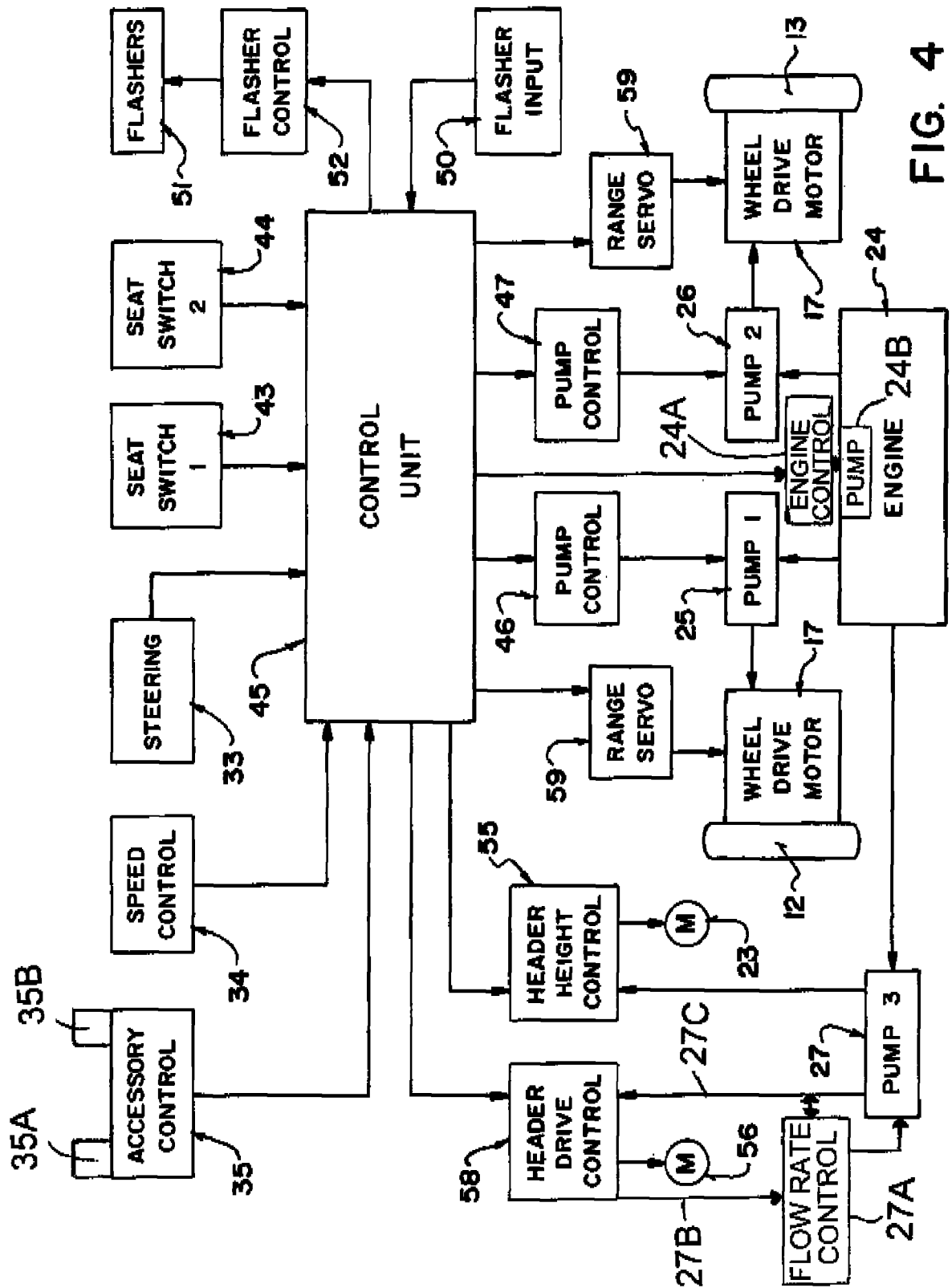
FIG. 4 is a schematic illustration of the control system for the tractor.

Turning now to the mechanical section as shown in FIG. 1 and the schematic control system as shown in FIG. 4. The speed control system 34 supplies signals to a control unit 45 which controls the pumps 25 and 26 through pump controls 46 and 47. The pump 25 supplies fluid to the drive motor 17 of the wheel 12. The pump 26 supplies fluid to the motor 17 of the wheel 13. The pumps are controlled to control the displacement of the pumps and therefore the amount of fluid generated in conventional manner. The rate of flow of fluid controls the rate of rotation of the respective motor so that the wheels rotate at a selected speed determine by the control of the pumps 25 and 26.

In addition the steering 33 supplies control signals to the control unit 45 which also acts to control the pumps 25 and 26 to generate a differential in the flow thereof so as to generate a differential in the speed of the motors 17. In the schematic illustration of a system shown in FIG. 4, this operation is effected by a control unit 45 which is responsive to the signal from the steering and from the speed control and thus selects the positions of the pumps accordingly. However it is also possible to provide a system in which this is effected mechanically by providing two separate inputs to the pump control arrangement to provide a required speed and then a differential between the two pump controls. Yet further this arrangement can be effected by valving the flow from the pumps 25 and 26 so as to transfer some flow from one to the other to provide the differential. Yet further the arrangement can be provided by a single pump and by valving the flow from the single pump to the drive motors 17 at the same rate or at a differential rate as required. All these systems are available and known to the person skilled in this art. The selection of which system to use depend upon various parameters well known to the person skilled in the art.

As shown in FIG. 4 the control unit 45 is also responsive to input from the seat switch sensors 43 and 44 so that operation of the systems shown in FIG. 4 is only possible when the seat switch is actuated indicating that the platform is in a selected one of the two positions. In addition the indication from the respective seat switch of the selected position of the seat console is entered into the control unit to control the operation of the tractor in dependence of the cab forward or engine forward orientation.

In addition to the basic control of the movement of the vehicle, the control unit also provides outputs for controlling other elements of the tractor. In a first element the control console includes a conventional flasher input lever indicated at 50 by which the operator can operate turn signals or four way flashers as indicated by the flashing lights 51. The control unit is arranged so that the four flashers indicated at 51 can be operated simultaneously by the flasher control 52 in both positions of cab forward and engine forward described previously. However, as it is intended that primary mode of high speed transportation of the tractor is in the engine forward position, the turn signals are operated by the flasher control 52 so that the turn signals will only operate when the operator console and tractor are arranged in the engine forward position as detected by the respective seat switch.

The header drive system including the height control cylinders 23 actuated by a control system 55 is driven with fluid from the pump 27 also driven by the engine 24. The pump also supplies fluid to a motor 56 which drives the operation of the header. This drive can comprise a single motor driving all the components of the header including the cutting knife, the reel and any collection system including drapers and/or augers. However individual motors and individual controls can be provided.

The flow rate output from the pump 27 is controlled by a control system 27A which is responsive to the required rate as indicated at 27B to maintain a constant rate on the output 27C to the motor 56 regardless of changes of drive speed of the engine 24 as the engine rpm is lugged down due to changes in load. Devices of this type are well known to a person skilled in this art and are used on previous tractors of this type.

The control unit 45 is arranged, in response to operation of the seat switch indicating that the operator console is in the cab forward position acts to allow actuation of the motor 56 through the drive control 58. When the seat is out of that position and particularly turned to the engine forward position, actuation of the header is prevented.

The height control 55 is arranged to provide adjustment of the height of cutting action and also to provide a raised position away from the cutting action. The control unit 45 is arranged to control the header/height control 55 so that the header is maintained in the raised inoperative position and cannot fall under automatic control to the cutting position.

The drive motors 17 also include adjustment by a servo unit 59 which selects different ranges for the motor. This is obtained by adjusting the cam plate of the motor to different displacement positions as is well known to one skilled in the art.

In one embodiment the drive motors 17 are arranged to have two different ranges that is a low speed range and a higher speed range. It is of course appreciated that the low speed range provides higher torque.

The control unit is arranged such that the high speed range can only be accessed when the operator console is in the engine forward position and thus cannot be accessed when the operator console is in the cab forward position. In this arrangement when the operator operates essentially one of the switches 35 to select one or other of the ranges, in the situation where the operator console is in the cab forward position, the system indicates to the operator that the high range cannot be accessed. In this way the intention is that the tractor can travel at significantly higher speeds in the engine forward position and is restricted to the lower speeds when in the cab forward position, bearing in mind that the tractor is unstable at the higher speeds when in the cab forward position.

In an alternative arrangement a three range motor can be provided with low, intermediate and high ranges accessible. In this arrangement the low and intermediate ranges are accessible in the cab forward position and the low and high ranges are accessible in the engine forward position. In the engine forward position the low ranges available for high torque and the high ranges are available for high speed. In the cab forward position the intermediate range is available for higher speed operation in the field.

In transportation, it is intended therefore that the operator's console is moved to the engine forward position and that the tractor moves forward rapidly at high speed in the transport position at a speed significantly higher than can be achieved in current tractors of this type. When the header is of a relatively narrow width, this header can remain in place and is simply carried behind the tractor. In a situation where the header is of significant width greater than can be accommodated in a road width, the header is disconnected from the supports 21 and 22 and is instead trailed on wheels attached to a hitch 60 at the end 11A of the tractor.

Narrower headers are left on the windrower tractor for transport whereas wider headers need to be removed and towed endwise to make a narrow safe transport package. The traction motor speed is determined by its displacement depending on swash plate position, which is controlled by a servo. The ranges are accomplished by different swash plate positions, default spring load to low speed for 2-speed machines and center position for 3-speed machines. Hydraulic pressure from a valve shifts the servo into high (and low range for 3-speed machines). The three speed feature on the motor was developed by our motor supplier at our request and is the first time hydrostatic 3-speed ranges are used on a windrower application. Windrower tractors fall into two categories:

Two speed windrowers—These machines have two speed ranges when in the engine forward position and only one speed range (low speed) in the cab forward position. Speed ranges are selectable by a single two-position switch with a computer determining the switch logic such that when high range is chosen in cab forward position the computer indicates that this speed range is not available.

Three speed windrowers—Three ground speed ranges are selectable by a single two-position switch with a computer determining the switch logic. Low and medium ranges are available in cab forward position and low & high ranges are available in the engine forward position. Low speed provides high wheel tractive effort to climb hills and trailers. The mid speed provides increased speed to cut crops that the new disc header is capable of handling. The high speed reduces time to get from field to field.

The control unit 45 communicates with an engine control system generally indicated at 24A which acts to control the operation of the engine and particularly the fuel injection pump 24B of the engine 24.

It will be appreciated that the engine RPM output to the pumps varies depending upon the load applied to the engine. Engines are selected of course so that the power output approximates to the required power input to the driven elements and in this case the pumps 1, 2 and 3. Thus in the situation where the vehicle is climbing a hill or in a situation where the crop becomes particularly heavy, the required power input to the pumps can exceed the power output thus reducing the engine RPM. Clearly it is undesirable that the engine RPM reduce to a level in which the power drops off and the engine stalls and this situation is controlled partly by the engine control system 24A and partly by the operator.

The output from the engine to the pumps 1 and 2 provides a direct drive of those pumps and in a situation where the pumps are stroked to the maximum output value, the amount of fluid output by the pumps will decrease proportionally to the decrease in engine RPM. In most cases to provide maximum forward speed, the pumps 25 and 26 are stroked to the maximum position so as to provide the maximum fluid flow to the motors 17.

However it is generally desirable that the fluid flow to the header remains constant in a situation where the engine RPM decreases. For this reason there is provided the flow rate control 27A which is responsive to the rate of flow in the line 27C and acts to control the pump 27 so that, as the engine RPM decreases, the stroke of the pump is correspondingly increased to maintain the required flow rate as determined by the header drive control 58.

Figure 5:
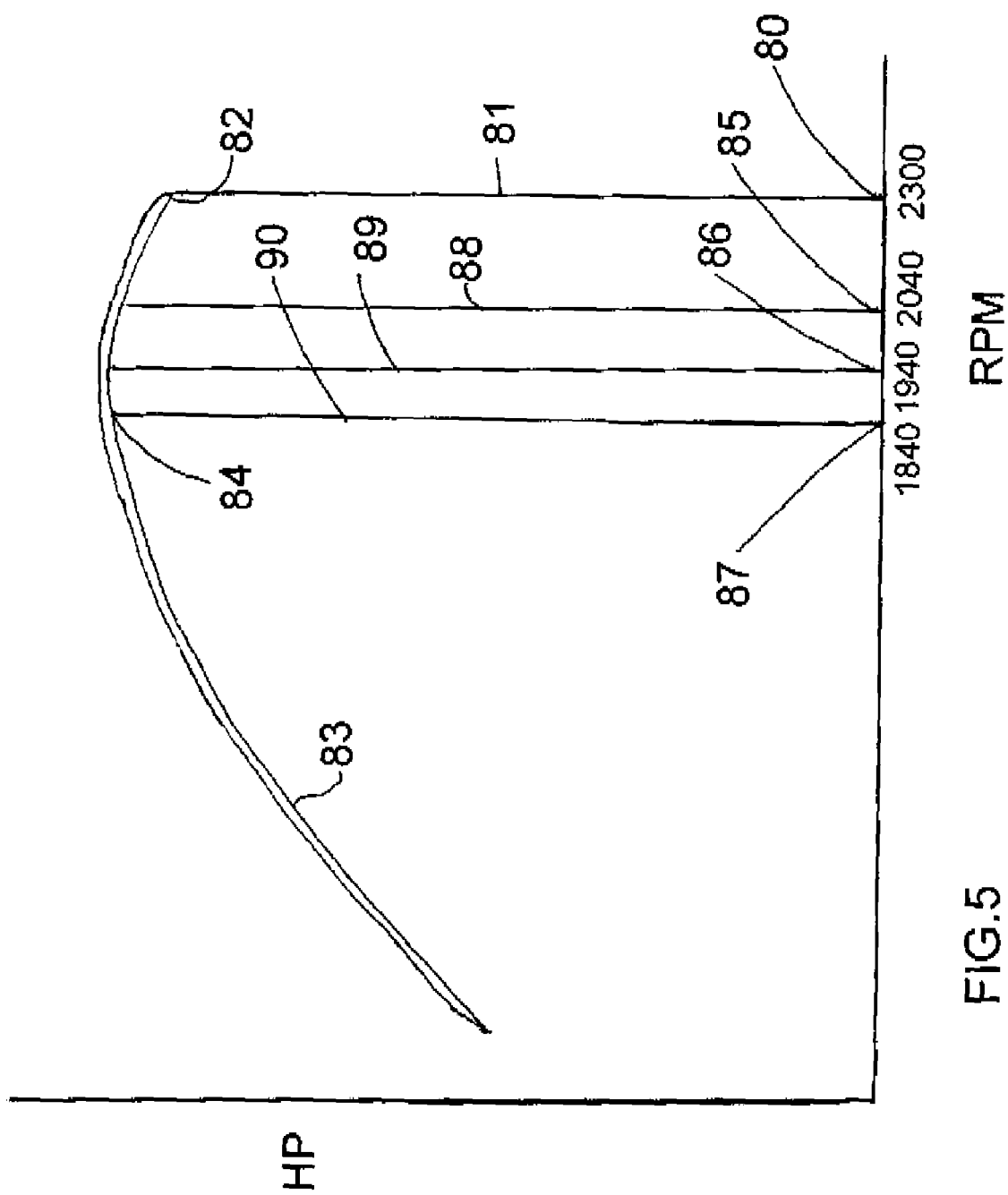
FIG. 5 is a graph showing the operation of the engine control system of the Tier Three engine to control output horse power at selected engine speeds within an allowable curve approved for suitable emissions.

Turning now to FIG. 5, a typical engine power output graph is illustrated which also shows a number of engine settings which can be selected within the control system of the control unit 24A. Thus the graph of FIG. 5 represents a graph of engine RPM vs Horsepower produced by the engine. The engine has a fixed maximum engine RPM which in the example shown is at 2300 RPM and is indicated at 80. A first line 81 shows the path of the graph as the power requirement to the engine is increased. Thus at point 80 the power output is zero at maximum engine RPM. As the power output increases under load, the engine RPM follows the line 81 up to a point 82 where the RPM gradually drops, in this example to a value of 2200. This point is defined by the intersection of the line 81 with a curve 83 which is determined based upon maximum allowable engine emissions. The curve is designed by control of the timing and amount of fuel injection by the pump 24B so as to provide the required engine characteristics. Thus the engine must provide the required output torque levels and output horsepower levels at required locations along the curve 83 while limiting emissions to the acceptable level as determined by EPA. It will be noted that the point 82 intersects the curve at a location where the horsepower is not at a maximum but is at a reduced level relative to a maximum point as indicated at 84 on the curve 83. In other words, if the load on the engine increases at the point 82, the engine control system causes the engine horsepower output to follow the curve 83 but the horsepower output increases from the point 82 to the point 84 as the RPM reduces. This selection of the characteristics of the engine is arranged so that there is a reduced tendency for the engine to stall as the RPM is lugged downwardly due to the increased load on the engine and this increase in load is resisted by the increase in horsepower output by the engine through to the point 84 on the curve 83. Of course beyond this point 84 at the maximum, the curve allows the horsepower to reduce as the RPM reduces, although the torque output of the engine may increase further beyond the point 84 as the RPM reduces.

The control system 24A is arranged to provide a number of engine speed settings which can be selected by programming the engine control 24A. In the example shown there are four such engine speed settings. The first of these is located at the point 80. The second of these is located at the point 85 which in the example shown provides an engine RPM of 2040. A third setting is located at point 86 which provides an engine RPM of 1940. The fourth setting is located at point 87 where the engine RPM is determined at 1840. Thus, by programming the control system, the engine can be arranged to follow the respective graph from the respective engine setting point. Thus from the second setting at the point 85, the engine speed and power output follows the line 88 through to the curve 83. Similarly from the point 86, the graph follows the line 89 and finally from the point 87 the graph follows the line 90, all of which intersect with the curve 83 at a separate point along that curve. Thus in each case the engine setting provides a predetermined maximum engine RPM and from that maximum RPM the engine RPM falls gradually as the load increases until the line meets the curve 83, whereupon the engine RPM follow the curve 83 and provides the power output so defined.

While it is known that tier 3 engines, which are required by EPA to have the above engine control system, have a series of such settings available within the control system, it is common that the engine is used in the maximum setting only commencing at the setting 80 since this is perceived to provide the maximum output from the engine.

However in the present arrangement, the control unit 45 is arranged to select different ones of the settings 80, 85, 86 and 87 at different situations of operation of the engine.

Thus it has been determined that the maximum set position 80 is only to be selected and is only necessary in the event that the vehicle is in transport mode in order that the maximum engine RPM be available for driving the pumps 25 and 26. Maximum vehicle speed is of paramount importance at the condition of transport and hence this requirement overrides other requirements thus requiring the selection of the highest available RPM in this mode. However, as explained hereinbefore, during operation of the vehicle in a harvesting mode when the header is in operation, the vehicle speed can be reduced from the maximum vehicle speed allowing the selection of one or other of the settings 85, 86 or 87. This selection has the advantage that the engine operates at a significantly reduced fuel consumption value and also that the engine operates at a considerably reduced noise value. However it will be appreciated that due to the curve 83 reaching its maximum at the point 84, the selection of one of the settings 85, 86 and 87 still allows the engine to operate with the ability to provide maximum horsepower output at or above the point 84.

The control unit can be programmed to operate the engine control 24A in dependence upon the number of characteristics so that the above operation is obtained. That is in the transport mode when maximum vehicle speed is required, setting 80 is selected and in field operation mode one of the other settings is selected.

Preferably the control unit 45 is arranged to receive input from the accessory control 35 which includes the header control switch 35A. In this way when the operator operates a switch 35A to commence actuation of the header, this requirement is communicated to the control unit 45. The control unit 45 then operates the engine control system 24A to select one of the settings 85, 86 and 87.

Which of these settings is selected can be determined by the operator using a separate programming system or can be selected by the manufacturer. In many cases a purchaser of a machine of this type will indicate which setting is to be programmed so that the actual selection of the setting is not accessible to the operator of the vehicle when in use. In this way the actual operator of the vehicle is required by the vehicle programming to operate the vehicle in the predetermined setting and the operator has no ability to change this. The selection of the setting can be determined based upon maximum fuel efficiency or other factors depending upon the required operation of the vehicle.

When the control unit 45 operates the engine control system 24A to select the required setting, this setting affects the speed control 34. Speed control 34 can of course be operated by the operator of the vehicle and in most cases moved to a maximum speed position at all times when forward movement is required. It will be appreciated that this maximum speed position will operate the engine only to the particular setting determined by the control unit 45. Thus in the setting 80, the speed control will cause the engine to be driven at the 2300 RPM setting. When a reduced RPM setting is selected such as setting 87, the speed control 34 when moved to the maximum position will operate the engine only at the predetermined setting of 1840 RPM.

As an alternative arrangement, the accessory control can include a switch 35 which directly can be operated to select the engine setting by communication through the control unit 45 to the engine control system 24A. This allows the operator to select the engine setting whenever the operator so chooses giving maximum flexibility but also allowing the operator to misuse the vehicle and operate with the header driven at the maximum RPM position 80 which is not preferred.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting machine comprising:
a tractor frame;
a crop harvesting header mounted on the tractor frame for movement across the ground to harvest a standing crop;
the header having at least one header hydraulic motor having a rotating output drive for driving rotation of components of the header in the harvesting action;
the tractor having a first driven ground wheel driven by a first hydraulic motor having a rotating output drive for rotating the first ground wheel and a second driven ground wheel driven by a second hydraulic motor having a rotating output drive for rotating the second ground wheel;
a header control to provide a first control signal indicative of a requirement for supply of driving fluid to the at least one header hydraulic motor to drive the components thereof and a second control signal indicative of a requirement to halt supply of driving fluid to the at least one header hydraulic motor to drive the components thereof;
a first pump for generating a flow in a first pressurized hydraulic fluid for driving the first and second hydraulic motors;
a second pump for generating a flow in a second pressurized hydraulic fluid for driving the at least one header hydraulic motor;
an internal combustion engine on the tractor frame for driving the first and second pumps;
the second pump having a flow rate control system for supplying a constant rate of the second pressurized hydraulic fluid for driving the at least one header hydraulic motor at a constant rotation rate regardless of changes of rpm of the engine;
the engine having a fuel injection pump;
an engine control system for controlling the fuel injection pump so as to control an amount of fuel injected and a timing of the injection;
a driver control system including a throttle control actuable by the driver to move between a minimum engine speed position and a maximum engine speed position to provide a control signal to the engine control system;
the engine control system being arranged to control fuel supply and injection timing so as to maintain engine power output at or below an allowable power output curve;
the engine control system being arranged to provide at least two selectable settings for engine rpm where a first one of the settings is at a higher'engine rpm and a second one of the settings is at a reduced engine rpm;
the first of the settings being selected in response to the second signal to halt drive to the header components;
the second of the settings being selected in response to the first signal to drive the header components;

the first setting being arranged such that, when selected, movement of the throttle control to the maximum engine speed position causes the engine control system to drive the engine at the higher engine rpm; and the second setting being arranged such that, when selected, movement of the throttle control to the maximum engine speed position causes the engine control system to drive the engine at the reduced engine rpm.

2. The machine according to claim 1 wherein the engine control system is arranged such that the allowable power output curve provides a power output at the higher engine rpm which is less than a power output at the reduced engine rpm.

3. The machine according to claim 1 wherein the higher engine rpm is a maximum allowable engine rpm.

4. The machine according to claim 1 wherein the header control is actuable by the driver and wherein the second of the settings is selected in response to actuation of the header control by the driver to drive the header components and the first of the settings is selected in response to actuation of the header control by the driver to halt drive to the header components.

5. The machine according to claim 1 wherein the first pump is arranged such that a rate of the first pressurized hydraulic fluid varies as the rpm of the engine changes.

6. The machine according to claim 1 wherein the first pump is arranged at a maximum stroke for maximum flow rate such that a rate of the first pressurized hydraulic fluid varies as the rpm of the engine changes.

7. The machine according to claim 1 wherein the first and second settings are selected by a manually operable switch operable by the driver.

8. The machine according to claim 1 wherein the engine control system is arranged such that the allowable power output curve provides a fuel usage of the engine at the second setting which is less than the fuel usage at the first setting.

9. A crop harvesting machine comprising:

a tractor frame;

a crop harvesting header mounted on the tractor frame for movement across the ground to harvest a standing crop;

the header having at least one header hydraulic motor having a rotating output drive for driving rotation of components of the header in the harvesting action;

the tractor having a first driven ground wheel driven by a first hydraulic motor having a rotating output drive for rotating the first ground wheel and a second driven ground wheel driven by a second hydraulic motor having a rotating output drive for rotating the second ground wheel;

a header control actuable by the driver to provide a control signal indicative of a requirement for supply of driving fluid to the at least one header hydraulic motor to drive the components thereof;

a first pump for generating a flow in a first pressurized hydraulic fluid for driving the first and second hydraulic motors;

a second pump for generating a flow in a second pressurized hydraulic fluid for driving the at least one header hydraulic motor;

an internal combustion engine on the tractor frame for driving the first and second pumps;

the second pump having a flow rate control system for supplying a constant rate of the second pressurized hydraulic fluid for driving the at least one header hydraulic motor at a constant rotation rate regardless of changes of rpm of the engine;

the engine having a fuel injection pump;

an engine control system for controlling the fuel injection pump so as to control an amount of fuel injected and a timing of the injection;

a driver control system including a throttle control actuable by the driver to move between a minimum engine speed position and a maximum engine speed position to provide a control signal to the engine control system;

the engine control system being arranged to control fuel supply and injection timing so as to maintain engine power output at or below an allowable power output curve;

the engine control system being arranged to provide at least two selectable settings for engine rpm where a first one of the settings is at a higher engine rpm and a second one of the settings is at a reduced engine rpm;

the first of the settings being selected when the header components are not driven;

the second of the settings being selected when the header components are driven;

the first setting being arranged such that, when selected, movement of the throttle control to the maximum engine speed position causes the engine control system to drive the engine at the higher engine rpm; and the second setting being arranged such that, when selected, movement of the throttle control to the maximum engine speed position causes the engine control system to drive the engine at the reduced engine rpm;

wherein there is provided a cab mounted on the tractor frame, the two driven wheels being mounted at a driven end of the tractor frame and there being provided two non-driven castor wheels of the tractor mounted at a second end of the tractor, the cab being mounted on the frame at the driven end, the driven end having mounting assemblies for supporting the header at a position in front of the driven end and in front of the cab when the driven end is forwards, the engine being located between the cab and the second end of the frame, there being provided an operator's seat on which the operator can sit which is rotatable in the cab from a cab forward position in which the operator's seat faces the driven end of the frame to an engine forward position in which the operator's seat faces the second end with the engine in front of the operator's seat, wherein the first and second settings are selected by a switch operable by rotation of the seat.

10. The machine according to claim 9 wherein the operation the speed control is changed such that the driven wheels can rotate at higher speed to drive the tractor at higher ground speed when the operator's seat is in the engine forward position.

11. The machine according to claim 9 wherein the engine control system is arranged such that the allowable power output curve provides a power output at the higher engine rpm which is less than a power output at the reduced engine rpm.

12. The machine according to claim 9 wherein the higher engine rpm is a maximum allowable engine rpm.

13. The machine according to claim 9 wherein the second of the settings is selected in response to actuation of the header control by the driver to drive the header components and the first of the settings is selected in response to actuation of the header control by the driver to halt drive to the header components.

14. A crop harvesting machine comprising:

a tractor frame;

a crop harvesting header mounted on the tractor frame for movement across the ground to harvest a standing crop;

the header having at least one header hydraulic motor having a rotating output drive for driving rotation of components of the header in the harvesting action;

the tractor having a first driven ground wheel driven by a first hydraulic motor having a rotating output drive for rotating the first ground wheel and a second driven ground wheel driven by a second hydraulic motor having a rotating output drive for rotating the second ground wheel;

a header control actuable by the driver to provide a control signal indicative of a requirement for supply of driving fluid to the at least one header hydraulic motor to drive the components thereof;

a first pump for generating a flow in a first pressurized hydraulic fluid for driving the first and second hydraulic motors;

a second pump for generating a flow in a second pressurized hydraulic fluid for driving the at least one header hydraulic motor;

an internal combustion engine on the tractor frame for driving the first and second pumps;

the second pump having a flow rate control system for supplying a constant rate of the second pressurized hydraulic fluid for driving the at least one header hydraulic motor at a constant rotation rate regardless of changes of rpm of the engine;

the engine having a fuel injection pump;

an engine control system for controlling the fuel injection pump so as to control an amount of fuel injected and a timing of the injection;

a driver control system including a throttle control actuable by the driver to move between a minimum engine speed position and a maximum engine speed position to provide a control signal to the engine control system;

the engine control system being arranged to control fuel supply and injection timing so as to maintain engine power output at or below an allowable power output curve;

the engine control system being arranged to provide at least two selectable settings for engine rpm where a first one of the settings is at a higher engine rpm and a second one of the settings is at a reduced engine rpm;

the first of the settings being selected when the header components are not driven;

the second of the settings being selected when the header components are driven;

the first setting being arranged such that, when selected, movement of the throttle control to the maximum engine speed position causes the engine control system to drive the engine at the higher engine rpm; and the second setting being arranged such that, when selected, movement of the throttle control to the maximum engine speed position causes the engine control system to drive the engine at the reduced engine rpm;

wherein the first and second motors have a higher speed drive range which can be accessed only when the engine control system is in the first setting.

15. The machine according to claim 14 wherein the first and second motors have a low speed range in the second setting and the low speed range and a high speed range in first setting.

16. The machine according to claim 14 wherein the first and second motors have one low speed range and one intermediate speed range in second setting and have the low speed range, and a high speed range in the first setting.

17. The machine according to claim 14 wherein the engine control system is arranged such that the allowable power output curve provides a power output at the higher engine rpm which is less than a power output at the reduced engine rpm.

18. The machine according to claim 14 wherein the higher engine rpm is a maximum allowable engine rpm.

19. The machine according to claim 14 wherein the second of the settings is selected in response to actuation of the header control by the driver to drive the header components and the first of the settings is selected in response to actuation of the header control by the driver to halt drive to the header components.

* * * * *